US011941824B2

(12) United States Patent
Lee et al.

(10) Patent No.: US 11,941,824 B2
(45) Date of Patent: Mar. 26, 2024

(54) VIDEO-BASED HAND AND GROUND REACTION FORCE DETERMINATION

(71) Applicant: Velocity EHS Inc., Chicago, IL (US)

(72) Inventors: SangHyun Lee, Ann Arbor, MI (US); Meiyin Liu, New Brunswick, NJ (US)

(73) Assignee: VelocityEHS Holdings, Inc., Chicago, IL (US)

( * ) Notice: Subject to any disclaimer, the term of this patent is extended or adjusted under 35 U.S.C. 154(b) by 0 days.

(21) Appl. No.: 17/718,818

(22) Filed: Apr. 12, 2022

(65) Prior Publication Data

US 2022/0327775 A1    Oct. 13, 2022

Related U.S. Application Data

(60) Provisional application No. 63/173,851, filed on Apr. 12, 2021.

(51) Int. Cl.
*G06T 7/246* (2017.01)
*G01L 1/00* (2006.01)
(Continued)

(52) U.S. Cl.
CPC .............. *G06T 7/251* (2017.01); *G01L 1/005* (2013.01); *G06T 17/005* (2013.01); *G06T 17/20* (2013.01); *G06T 19/00* (2013.01); *G06V 40/28* (2022.01); *G06T 2200/04* (2013.01); *G06T 2200/08* (2013.01); *G06T 2207/10016* (2013.01); *G06T 2207/20084* (2013.01)

(58) Field of Classification Search
None
See application file for complete search history.

(56) References Cited

U.S. PATENT DOCUMENTS 11,324,439 B2   5/2022   Diaz-Arias et al.
11,482,048 B1   10/2022  Diaz-Arias et al.
(Continued)

OTHER PUBLICATIONS

Title: Continuous ambulatory hand force monitoring during manual materials handling using instrumented force shoes and an inertial motion capture suit; Author: Faber et al.; Date: 2017; Source: https://doi.org/10.1016/j.jbiomech.2017.10.006 (Year: 2017).*

(Continued)

*Primary Examiner* — Jwalant Amin
(74) *Attorney, Agent, or Firm* — K&L Gates LLP

(57) ABSTRACT

A method for determining a hand force and a ground reaction force for a musculoskeletal body of a subject includes obtaining video data for the musculoskeletal body during an action taken by the subject, generating, for each frame of the video data, three-dimensional pose data for the subject based on a three-dimensional skeletal model, and determining the hand force and the ground reaction force based on the three-dimensional pose data. Determining the hand force and the ground reaction force includes implementing a reconstruction of the hand force and the ground reaction force based on the three-dimensional pose data. The method additionally includes applying the three-dimensional pose data, the estimate for the ground reaction force, and the estimate of the hand force, to a neural network or other model to optimize the estimate of the hand force and the estimate of the ground reaction force.

20 Claims, 2 Drawing Sheets

(51) Int. Cl.
*G06T 17/00* (2006.01)
*G06T 17/20* (2006.01)
*G06T 19/00* (2011.01)
*G06V 40/20* (2022.01)

(56) References Cited

U.S. PATENT DOCUMENTS

| | | | |
|---|---|---|---|
| 2009/0082701 A1* | 3/2009 | Zohar | G09B 23/28 600/595 |
| 2019/0228330 A1* | 7/2019 | Kaifosh | G06F 3/014 |
| 2021/0205666 A1* | 7/2021 | Fukushi | G16H 40/67 |
| 2022/0079510 A1 | 3/2022 | Robillard et al. | |
| 2022/0117755 A1* | 4/2022 | McGuan | G16H 10/60 |
| 2022/0386942 A1 | 12/2022 | Diaz-Arias et al. | |

OTHER PUBLICATIONS

Title: Relationship Between the Ground Reaction Forces and the Forces Relationship Between the Ground Reaction Forces and the Forces Exerted by the Hands During Automotive Tasks; Date: Jul. 7, 2020; Author: Mallak Hamatto; Source: https://scholar.uwindsor.ca/cgi/viewcontent.cgi?article=9369&context=etd (Year: 2020).*

Title: Dynamically adjustable foot-ground contact model to estimate ground reaction force during walking and running; Author: Jung et al.; Date: 2016; Source: http://dx.doi.org/10.1016/j.gaitpost.2016.01.005 (Year: 2016).*

Title: Ground Reaction Force Estimation Using Musculoskeletal Simulation; Author: Yihwan Jung et al.; Date: 2012; Source: https://ojs.ub.uni-konstanz.de/cpa/article/view/5332 (Year: 2012).*

Title: Inertial Motion Capture-Based Whole-Body Inverse Dynamics; Author: Diraneyya et al.; Date: 2021; Source: https://doi.org/10.3390/s21217353 (Year: 2021).*

Title: Estimation of Ground Reaction Forces and Moments During Gait Using Only Inertial Motion Capture; Author: Karatsidis et al.; Date: 2017; Source: https://www.ncbi.nlm.nih.gov/pmc/articles/PMC5298648/ (Year: 2017).*

* cited by examiner

VIDEO-BASED HAND AND GROUND REACTION FORCE DETERMINATION

PRIORITY CLAIM

This application claims priority to and the benefit as a non-provisional application of U.S. Provisional Patent Application No. 63/173,851, filed on Apr. 12, 2021, the entire contents of which are hereby incorporated by reference and relied upon.

FIELD OF THE DISCLOSURE

The disclosure relates generally to the determination of forces exerted on musculoskeletal body parts during work-related and other activities.

BACKGROUND

Work-related musculoskeletal disorders (WMSDs) are a leading cause of pain, suffering, and disability in the U.S. workforce. WMSDs account for one-third of nonfatal occupational injuries in the U.S., which is equivalent to 365,580 injuries and illnesses in 2014. To address WMSDs, safety professionals in organizations conduct ergonomic risk assessments that identify the tasks that present high ergonomic risk. Changes to work processes and tools may then be implemented to reduce that risk. However, safety professionals are frustrated with the limited tools for rapid and easy ergonomic risk assessment. For instance, many ergonomic risks come from excessive force exertion (e.g., lifting a heavy box). However, it is very difficult to measure force exerted on each body part, such as the lower back and shoulder, while workers are engaged in their tasks. Sensor-based force measurement techniques have been applied, but sensors must be worn by workers or attached to objects. Sensor-based techniques and tools for force measurement are thus invasive, time-consuming, cumbersome, and eventually undesirable for use in real jobsites.

SUMMARY

In accordance with one aspect of the disclosure, a method for determining a hand force and a ground reaction force for a musculoskeletal body of a subject includes obtaining video data for the musculoskeletal body during an action taken by the subject. The video data includes a plurality of frames. The method also includes generating, for each frame of the plurality of frames, three-dimensional pose data for the subject based on a three-dimensional skeletal model, and determining the hand force and the ground reaction force based on the three-dimensional pose data. Determining the hand force and the ground reaction force includes implementing a reconstruction of the hand force and the ground reaction force based on the three-dimensional pose data. The reconstruction is configured to determine an estimate for the ground reaction force in conjunction with an estimate for the hand force such that the estimate for the hand force is based on the estimate for the ground reaction force. The method further includes applying the three-dimensional pose data, the estimate for the ground reaction force, and the estimate of the hand force, to a recurrent neural network or a computer vision deep neural network to optimize the estimate of the hand force and the estimate of the ground reaction force.

In accordance with yet another aspect of the disclosure, a system for determining a hand force and a ground reaction force for a musculoskeletal body of a subject includes a memory in which pose estimation instructions, force reconstruction instructions, and force optimization instructions are stored. The system also includes a processor configured to obtain video data for the musculoskeletal body during an action taken by the subject. The video data includes a plurality of frames. The processor is further configured to, upon execution of the pose estimation instructions, generate, for each frame of the plurality of frames, three-dimensional pose data for the subject based on a three-dimensional skeletal model, upon execution of the force reconstruction instructions, implement a reconstruction of the hand force and the ground reaction force exerted on the musculoskeletal body during the action based on the three-dimensional pose data, the reconstruction being configured to determine an estimate for the ground reaction force in conjunction with an estimate for the hand force such that the estimate for the hand force is based on the estimate for the ground reaction force, and, upon execution of the force optimization instructions, apply the three-dimensional pose data, the estimate for the ground reaction force, and the estimate of the hand force, to a recurrent neural network to optimize the estimate of the hand force and the estimate of the ground reaction force.

In connection with any one of the aforementioned aspects, the systems and/or methods described herein may alternatively or additionally include or involve any combination of one or more of the following aspects or features. The reconstruction is based on a tree model. The method further includes providing, with the processor, an output indicative of the determined hand force to a graphics engine to apply the output to a procedure for rendering an image implemented by the graphics engine. The recurrent neural network includes a long short-term memory (LSTM) neural network. Implementing the reconstruction includes determining a range for the ground reaction force based on constraints indicative of a set of configurations for the musculoskeletal body. The reconstruction is configured to determine the estimate for the ground reaction force for each frame of the plurality of frames. The optimization routine is configured to determine the ground reaction force for each frame of the plurality of frames. Obtaining the video data includes capturing, with a camera device, the video data. The method further includes generating, with the processor, an internal load exerted on the musculoskeletal body based on the determined ground reaction force and the determined hand force. The method further includes generating, with the processor, an external force exerted by the musculoskeletal body based on the determined hand force and the determined ground reaction force. Output generation instructions are stored on the memory. The processor is further configured to, upon execution of the output generation instructions, generate an internal load exerted on the musculoskeletal body based on the optimized estimate of the hand force.

In light of the present disclosure and the above aspects, it is therefore an advantage of the present disclosure to determine a hand force and a ground reaction force of a subject based on video data.

In light of the present disclosure and the above aspects, it is therefore an additional advantage of the present disclosure to determine a comprehensive ergonomic risk assessment that identifies potential ergonomic risk factors for a subject.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description.

Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

For a more complete understanding of the disclosure, reference should be made to the following detailed description and accompanying drawing figures, in which like reference numerals identify like elements in the figures.

Figure 1:
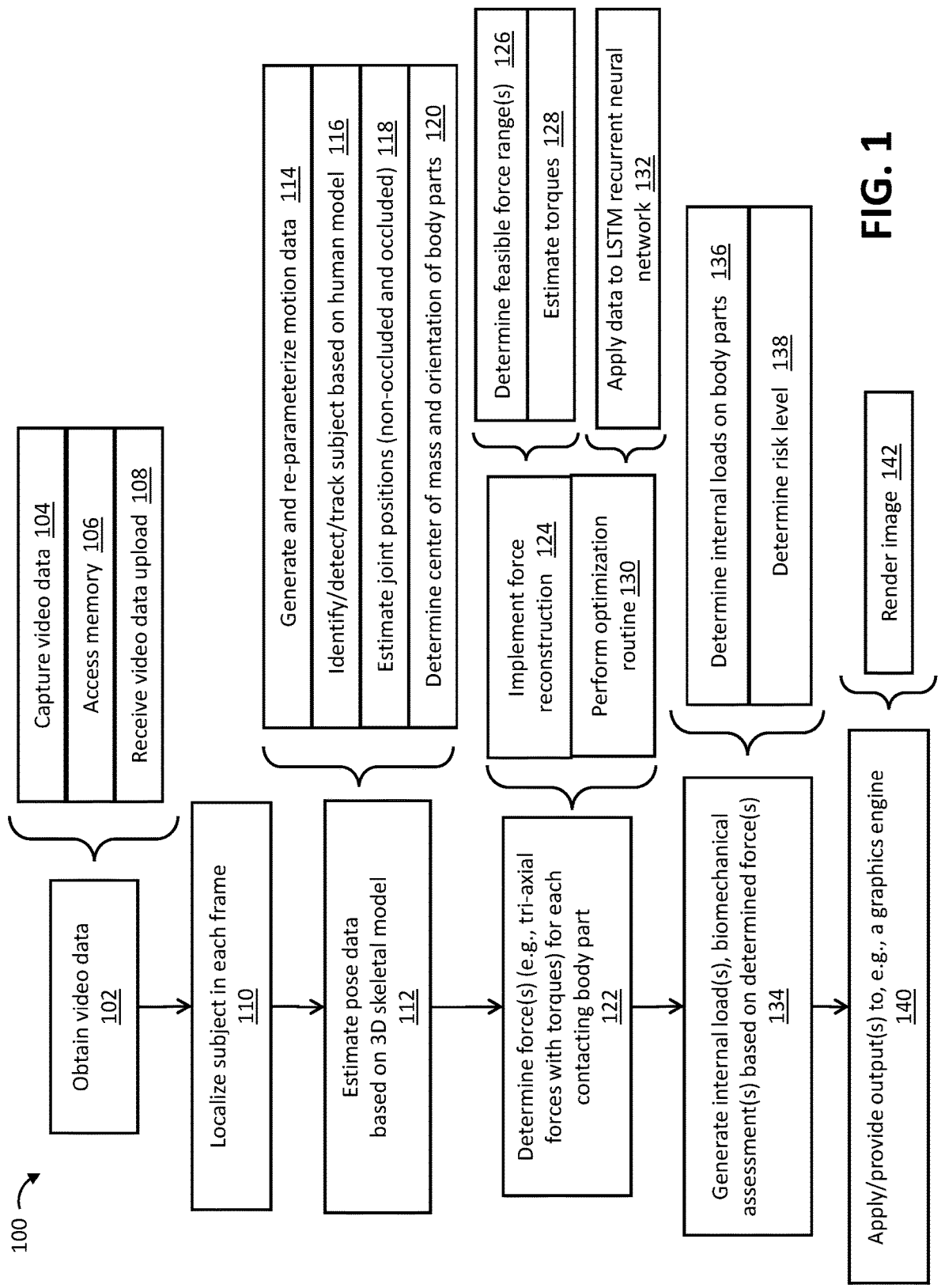
FIG. 1 is a flow diagram of a method for determining a hand force for a hand of a musculoskeletal body of a subject based on video data and a ground reaction force, in accordance with one example.

The embodiments of the disclosed systems and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION

Methods and systems for determining a hand force based on video data and a ground reaction force are described. The disclosed methods and systems determine an estimate for the ground reaction force in conjunction with an estimate for the hand force such that the estimate for the hand force is based on the estimate for the ground reaction force. The hand and ground reaction forces may thus be simultaneously estimated. The simultaneous estimation of the hand and ground reaction force improves the accuracy and reliability of the hand force determination, as well as the ground reaction force determination. In these and other ways, the disclosed methods and systems differ from past techniques that attempted to determine hand forces without estimating ground reaction forces.

The disclosed methods and systems may determine the hand and/or ground reaction forces by processing motion or other video data. The video data may be captured with a mobile device, such as a smartphone. Three-dimensional or two-dimensional motion data may be extracted from the video data. As a result, the motion data may be captured without forcing the worker to wear sensors or markers. The force data may thus be estimated without interfering with the activities of the workers or other individuals being monitored.

In some cases, the disclosed methods and systems may use the determined hand and/or ground reaction forces to determine forces (e.g., loads) exerted on other (e.g., internal) body parts, such as the neck, shoulder, back, and knees. The disclosed methods and systems may also use the video data to address posture-oriented risk factors (e.g., severely bending/twisting one's back). Indeed, many WMSDs are caused by the combination of excessively exerted force and awkward/repeated posture (e.g., lifting a heavy box while severely bending/twisting one's back). As a result, the disclosed methods and systems may provide an output indicative of a comprehensive ergonomic risk assessment that identifies potential ergonomic risk factors. Rapid, easy, efficient, and affordable ergonomic risk assessments may thus be provided without hindering activity in real jobsites.

FIG. 10 illustrates one example of the inputs and outputs of extraction of data, information, or text from extracted portions of an image, according to at least one aspect of the present disclosure.

The disclosed methods and systems address the challenge of estimating ground reaction forces based on motion or other video data. One challenging aspect involves the indirect nature of the measurement. The ground reaction force is measured indirectly by inferring from the location, speed, acceleration, and kinematic constraints of each body part tracked in the video data. The indirect measurement is also achieved without interfering with the work or other actions of the individual being monitored. Further challenges are presented by real-world settings (e.g., jobsites, such as manufacturing plants), in which occlusions (objects or structures obscuring the worker's body) are frequent. Still further, because motions and forces are dependent upon each other, particularly in connection with force estimation, any subsequent analysis (e.g., biomechanical analysis) is sensitive to a small error in either the motions or the forces.

The disclosed methods and systems may use kinematic model- and/or physics-based reconstruction techniques to generate the estimates of the hand and ground reaction forces. The reconstruction may be configured to robustly track the locations of each body part over time (e.g., in complicated work environments), and to learn the relationships between their changing properties (e.g., locations, speed and acceleration) to reliably infer the forces, taking into account spatiotemporal constraints imposed by a kinematic or physics-based model. A recurrent neural network-based optimization may then be used to optimize the estimates. In some embodiments, a computer vision deep neural network model may be used as an input for force estimation.

Although described in connection with applications involving ergonomic risk assessments, the disclosed methods and systems may be used to support a wide variety of biomechanical analyses or determinations. For instance, the hand and/or ground reaction forces determined by the disclosed methods and systems may be used to determine the magnitude of a force exerted by a body part, such as a first or a foot. The force magnitude may then be used in various contexts, including, for instance, video games and other biomechanical simulations. The disclosed methods and systems are accordingly not limited to determining internal loads or assessing other ergonomic risks.

FIG. 1 depicts a method 100 for determining hand and ground reaction forces for a musculoskeletal body of a subject. The method 100 is computer-implemented or otherwise implemented with or by a processor. The processor may be or include any number of processing units. In some cases, the processor is a general purpose or central processor of a computing system. The computing system may or may not include or be otherwise integrated with a device or system configured to capture video data of the subject.

In an act 102, video data is obtained for the musculoskeletal body during an action taken by the subject. The video data includes a plurality of frames. The act 102 may include an act 104 in which the video data is captured. The video data may be captured by any camera or other device. In some cases, the device is a smartphone or other portable electronic device having one or more cameras. The device may be integrated with one or more other components of the disclosed systems to any desired extent. Alternatively or additionally, the video data is obtained by accessing one or more memories in an act 106. In such cases, the video data may have been previously captured, and then transmitted to and/or stored by the processor for processing. For instance, the processor may receive an upload of video data in an act 108. The video data may be uploaded to a server computer or other networked computing system for processing in accordance with the method 100 in such cases.

The method 100 may include one or more acts directed to preprocessing of the video data. The preprocessing act(s) may be configured to convert the video data into another format more suitable for data processing, e.g., as motion data. Alternatively or additionally, the preprocessing act(s) may be directed to detecting a subject captured in the video data. In the example of FIG. 1, the method 100 includes an act 110 in which a subject is localized in each frame of the video data. The method 100 may include one or more additional or alternative preprocessing acts, including, for instance, acts configured to de-noise or otherwise filter the video data.

In an act 112, three-dimensional (or two-dimensional) pose data for the subject is generated for each frame. The three-dimensional pose data may be generated based on a three-dimensional skeletal model. For example, the skeletal model may be or otherwise include three-dimensional location data of a number of major body joints, e.g., ankles, knees, hips, wrists, elbows, shoulders. The location data may be represented in the camera's coordinate system. For instance, the location data may specify pixel location (x, y) in the image data (e.g., x and y), as well as depth (z) of the joint on pixel location's scale.

The three-dimensional skeletal model may be used to implement a number of data processing procedures underlying the determination of the pose data. For instance, in some cases, the act 112 includes an act 114 in which motion data is generated and re-parameterized. The re-parameterization of the motion data may be implemented in accordance with the three-dimensional skeletal model. In some cases, the re-parameterization may convert the three-dimensional location of the body joints to the three-dimensional location and orientation of the center of mass of the body joints. The orientation of the mass of each body part is represented by a rotation matrix, which is the product of three rotation matrix formed from three components of postural angles e.g., flexion/extension, abduction/adduction, and axial rotation.

The three-dimensional skeletal model may be provided as part of a kinematic modeling procedure. The subsequent force estimation involves motion data represented in each parent segment's local coordinate system, collectively with a full six degrees of freedom (DOF). In some cases, the vision-based motion capture may generate a human model with a reduced one to three DOF, depending on the type of the joint. To estimate force and moments with a full six DOF, the three-dimensional skeletal model is reparametrized while recovering or incorporating the reduced DOF. The parameterization may use arbitrary, manually assigned global coordinate axes. The re-parameterization may target intuitive postural angles, like flexion/extension (forward/backward-bending). For body parts to recover DOF, an extra local coordinate axis (e.g., two adjacent body link vectors' normal vector) may be added, and then, a third axis may be defined from these two. For body parts with lost DOF (e.g., neck twisting angle), their representation may use a product of three rotation matrices, each representing a DOF, which may flexibly lose any postural angles' rotation matrix without affecting the final form from being a matrix of the same dimension.

Using the motion data, the subject may be identified or detected, and then tracked in an act 116 based on the three-dimensional skeletal model. Identification of the subject may be useful to ensure that, for instance, the focus is on the subject of interest, e.g., in a crowded jobsite. In the example of FIG. 1, joint positions are estimated in an act 118. The act 118 may include cropping out the subject for the human pose estimation model to locate each body joint's location in the three-dimensional space. The three-dimensional skeletal model may be useful in multiple ways in the detection and tracking, insofar as the joints may be non-occluded or occluded in the video data. The act 112 may still further include an act 120, in which the center of mass and orientation of body parts are determined. The act 112 may include additional, fewer, or alternative acts. For instance, the pose data determination may include one or more post processing acts, such as enforcing fixed body part length and range of motion across frames, evaluation of the quality of the initial frame-wise, three-dimensional pose data, exclusion of pose data with low confidence due to occlusion and/or misdetection, and/or recovery of lost trajectory segments by exploiting anthropometry and range of motion.

The hand force and/or ground reaction forces are then determined in an act 122 based on the three-dimensional pose data. The act 122 includes implementation of a reconstruction of the hand force and/or ground reaction forces in an act 124 based on the three-dimensional pose data. The reconstruction is configured to determine an estimate for the ground reaction force in conjunction with an estimate for the hand force such that the estimate for the hand force is based on the estimate for the ground reaction force. For instance, to determine the forces exerted on four contacting points (e.g., two hands and two feet), the skeletal model may be formulated in a tree structure. In the model, the pelvis (e.g., the center of two hip joints) is defined as a root node while four limbs are formulated as separate branches from the pelvis to the limb's tip, e.g., wrists and ankles.

The hand and ground reaction forces may be multi-dimensional (e.g., three-dimensional or two-dimensional). For instance, the hand and ground reaction forces may be tri-axial with torques about each axis. References herein to the hand force or the ground reaction force may accordingly include magnitude data for the force along one or more axes, as well as the torque about one or more axes.

The reconstruction may be or otherwise include a physics-based reconstruction. In some cases, the physics-based reconstruction utilizes Lagrange's equations as derived from D'Alembert's principle to describe the dynamics of motion. The equations of motion may be expressed in vector form as follows:

$$M(q)\ddot{q} + C(q,\dot{q}) = Q$$

where $M(q)$ is the mass matrix, $\ddot{q}$ is the generalized acceleration, $C(q,\dot{q})$ is the Coriolis and centrifugal term, and $Q$ is the vector of generalized forces.

Using the transformation from the Cartesian coordinate system to a generalized coordinate system, the equations of motion may be formulated as follows:

$$(J^T M_c J)\ddot{q} + (J^T M_c \dot{J} + J^T[\omega] M_c J)\dot{q} = J_v^T f + J_w^T \tau$$

This equation is essentially identical with the prior one, and thus the mass matrix, Coriolis and centrifugal term, as well as the generalized forces can be represented as follows:

$$M(q) = J^T M_c J \quad C(q,\dot{q}) = (J^T M_c \dot{J} + J^T[\omega] M_c J)\dot{q} \quad Q = J_v^T f + J_w^T \tau$$

Further details regarding representations of the variables $M_c$, $J_v$, $J_\omega$, etc. may be found in Liu and Sumit, "A Quick Tutorial on Multibody Dynamics" (2011), the entire disclosure of which is hereby incorporated by reference. In accordance with the disclosure, the generalized coordinates of body parts (as opposed to body joints) may be formulated by a Jacobian matrix relating Cartesian coordinates to the proposed parameters with the location of the body parts and orientation of their center of mass. A mass matrix is used to represent the complete skeletal model by incorporating its tree-structure configuration and encode the mass of each body part at corresponding location of the body part.

In some cases, the reconstruction implemented in the act 124 is based on a tree model, as described above.

In some cases, each estimate is or otherwise includes a range of feasible forces for each contacting body part. For instance, feasible force ranges may be determined for each hand, and the ground reaction force for each foot, for each frame of the video data. In the example of FIG. 1, feasible force ranges are determined for one or more axes in an act 126. The force range determination may be based on constraints indicative of a set of configurations for the musculoskeletal body. For example, the set of configurations may specify or otherwise include position data for the joints, as described above. The torque about one or more axes is estimated in an act 128. The torque estimate(s) may or may not be or include feasible ranges and/or initial values, as described herein in connection with the axial forces.

The force estimation procedure may use physics-based equations to determine a feasible minimum force from the three-dimensional skeletal model. The act 122 may also take into account the human body's actual exerted force, which depends heavily on its adaptive response to the contact object throughout the interaction process. Additionally, mapping between the motion of the subject and the exerted force strongly correlates with the body's capability. To address these considerations, the estimated force may be optimized, e.g., by a recurrent neural network (RNN) or a computer vision deep neural network, which is trained by actual human motion and exerted external forces, instead of using the minimum required force from the equations. The RNN is useful for modelling temporal patterns. To capture a long-term pattern, such as a half-way peak force in pushing tasks, as well as sense short-term patterns, like the speed of ascending toward peak force in a push, a long short-term memory (LSTM) may be used. The LSTM RNN is well-suited to capture both general and local temporal patterns. The input feature vector to the network may include frame-wise full-body motion data and external forces with torques estimated from the motion equations. The output is the tri-axial optimized external forces with torques. Thus, for each external contacting body part, such as a hand, the module generates a six time series of force data. In some embodiments, the results of the physics-based equations may be mixed with the LSTM.

In the example of FIG. 1, the force determination of the act 122 includes performance of an optimization route in an act 130. The act 130 may include application of the three-dimensional pose data, the estimate for the ground reaction force, and the estimate of the hand force, to a recurrent neural network. In some cases, the recurrent neural network is or otherwise include a long short-term memory (LSTM) neural network in an act 132. Additional or alternative types of neural networks may be used. For instance, other types of neural networks that are useful for processing time-series data and/or learning temporal patterns may be used, such as a computer vision deep neural network. The recurrent neural network may be used to optimize the estimate of the hand force and/or the estimate of the ground reaction force. In some cases, the hand and ground reaction forces are optimized together or concurrently, e.g., the estimates for the hand and ground reaction forces are concurrently applied to the same neural network for optimization together.

The application of the data to the recurrent neural network may include the formulation of a feature vector for each image frame of video data. The feature vector may include data representative of the reconstructed external forces (e.g., force and torque magnitudes for each axis) exerted on each hand and foot. The motion data from the three-dimensional pose data may also be included in the feature vectors.

The recurrent neural network may include multiple layers. For example, the following four layers may be included in some cases—an LSTM layer, a fully connected layer, a dropout layer, and another fully connected layer. Additional, fewer, or alternative layers may be used. The recurrent neural network may include a number of units, with each unit including a cell, an input gate, an output gate, and a forget gate. The cell is where the memory of the neural network is stored. The other three gates may be configured to regulate or control the flow of information.

The method 100 may include a number of acts directed to applications of the force data determined in the act 122. In the example of FIG. 1, the method 100 includes an act 134 in which one or more internal loads, forces, and/or other biomechanical assessments are generated based on the determined force(s) (e.g., the determined ground reaction force(s) and the determined hand force(s)). In some cases, the act 134 includes an act 136 in which the internal load exerted on one or more body parts, such as a spine, knee, or other joint or portion of the musculoskeletal body, is determined. For example, the hand and ground reaction forces may be input into biomechanical analysis software, such as OpenSim and 3D SSPP, to estimate the internal loads exerted on each body joint. Alternatively or additionally, an ergonomic or other risk level is determined in an act 138. The risk level or other biomechanical assessment may or may not be based on the internal load(s) determined in the act 136.

The method 100 may alternatively or additionally include other acts directed to applications of the force data determined in the act 122. FIG. 1 depicts another example in an act 140, in which one or more outputs are applied or otherwise provided to a graphics or other engine. For instance, the outputs may include an external force exerted by (rather than onto) the musculoskeletal body, such as a first or hand, based on the determined hand force and/or the determined ground reaction force. The external force exerted by the musculoskeletal body may be an equal and opposite force to the force applied to the body. An output indicative of the force exerted by the body part may be provided to the graphics or other engine. The graphics engine may be a component of a video game or other system configured to render images. The output may be used to support the image rendering and/or otherwise control the video game. The act 140 may accordingly include an act 142 in which an image is rendered in accordance with a procedure of the graphics engine responsive to the output.

The method 100 may include fewer, additional, or alternative acts. For example, the method 100 may not include the generation of a biomechanical assessment in the act 134.

The acts of the method 100 may be implemented in an order differing from the example shown in FIG. 1. For instance, the localization of the subject in each frame in the act 110 may be implemented concurrently with one or more aspects of the pose data estimation in the act 112, such as the identification or detection of the subject in the act 116.

Figure 2:
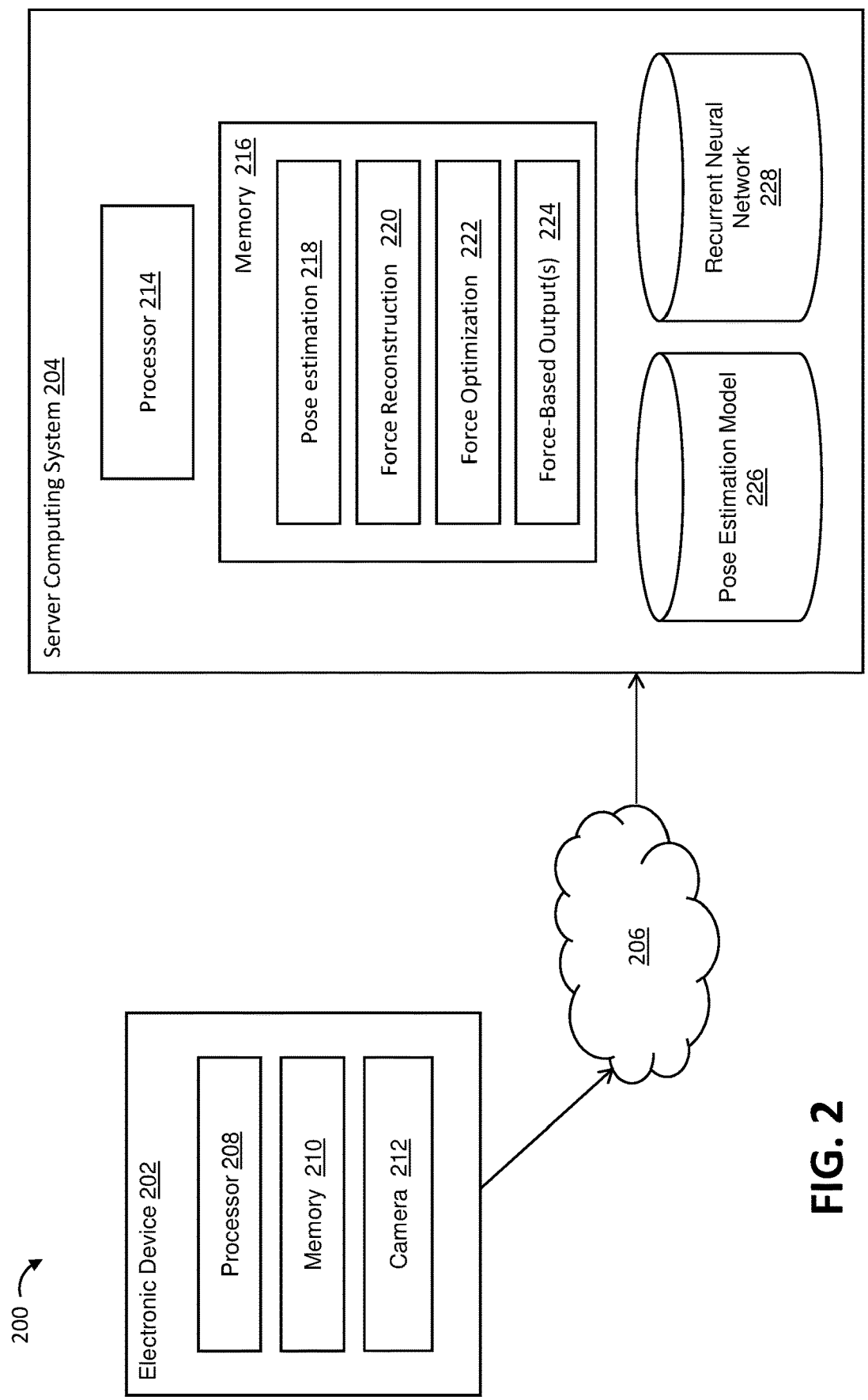
FIG. 2 is a block diagram of a system for determining a hand force for a hand of a musculoskeletal body of a subject based on video data and a ground reaction force, in accordance with one example.

FIG. 2 depicts a system 200 for determining one or more hand forces and/or one or more ground reaction forces for a musculoskeletal body of a subject. The system 200 may be configured or used to implement the method 100 of FIG. 1 and/or another method. For instance, one or more computers or other processors of the system 200 may correspond with the processor used to implement the method 100.

In the example of FIG. 2, the system 200 includes an electronic device 202 and a server computing system 204. The electronic device 202 may be or otherwise include a smartphone or other portable device. The server computer system 204 may be or include any workstation or other computing device. The server computer system 204 is in communication with the electronic device 202 via a network 206. The network may be or otherwise include a private network, a public network (e.g., the internet), or any combination thereof.

The system 200 may include fewer, additional, or alternative elements. For instance, the system 200 may not include a separate electronic device 202 in cases in which the video data is captured and processed by a single device. The elements of the system 200 may thus be integrated to any desired extent. In some cases, the system 204 includes one or more additional components for display, delivery, or other processing or use of the force-based output data generated by the system 200. For example, the server computing system 204 may download the force-based and/or other output data to another computing device or system for display on a user interface.

The electronic device 202 includes a processor 208, a memory 210, and a camera 212. In this case, the camera 212 is used to capture video data of the subject. The video data may or may not be processed by the processor 208 of the electronic device 202 before uploading or other communication to the server computing system 204 via the network 206 for determination of the hand and ground reaction forces for the subject. In other cases, some or all of the data processing of the disclosed methods and systems is implemented via the processor 208 of the electronic device 202.

The server computing system 204 includes a processor 214 and a memory 216. The processor 214 may include any number of processing units, cores, or other elements. In some cases, the processor 214 is or otherwise includes a general purpose or central processing unit (CPU) or other general purpose processor. Alternatively or additionally, the processor 214 is or otherwise includes a graphics processing unit (GPU). The memory 216 may include any number of memory or storage units of similar or dissimilar type (e.g., addressable and non-addressable, volatile and non-volatile, etc.).

Stored on the memory 216 are a number of instruction sets for execution by the processor 214. In the example of FIG. 2, pose estimation instructions 218, force reconstruction instructions 220, force optimization instructions 222, and output instructions 224 are stored on the memory 216. The instructions may be integrated with one another to any desired extent. The instructions may be executed by the processor 214 to implement the method 100 of FIG. 1, and/or another method. Additional, fewer, or alternative instructions may be included. For instance, one or more sets of instructions may be included for configuring the processor 214 to capture or otherwise obtain and/or preprocess the video data for the musculoskeletal body during the action taken by the subject. In some cases, some or all of the video data is stored and accessible in a portion of the memory 216, such as a storage device of the memory 216.

The processor 214 is configured, upon execution of the pose estimation instructions 218, to generate, for each frame of the plurality of frames of the video data, three-dimensional pose data for the subject based on a three-dimensional skeletal model. The pose data may be generated as described herein. Data indicative of the three-dimensional skeletal model may be stored in a database or other data store 226. The data store 226 may be integrated with the memory 216 to any desired extent. In some embodiments, two-dimensional pose data may be generated based on a three-dimensional skeletal model.

The processor 214 is configured, upon execution of the force reconstruction instructions 220, to implement a reconstruction of one or more forces exerted on the musculoskeletal body during the action based on the three-dimensional (or two-dimensional) pose data. The force(s) may include any number of hand forces and any number of ground reaction forces. The reconstruction is configured to determine an estimate for the ground reaction force in conjunction with an estimate for the hand force such that the estimate for the hand force is based on the estimate for the ground reaction force, as described above.

The processor 214 is configured, upon execution of the force optimization instructions 222, to apply the three-dimensional pose data, the estimate for the ground reaction force, and the estimate of the hand force, to a recurrent neural network or a computer vision deep neural network. In the example of FIG. 2, data indicative of the recurrent neural network or the computer vision deep neural network is stored in a database or other data store 228. The data store 228 may be integrated with the memory 216 and/or the data store 226 to any desired extent. The estimate(s) of the hand force(s) and/or the ground reaction force(s) may thus be optimized as described above.

In the example of FIG. 2, the processor 214 is also configured, upon execution of the output instructions 224 to generate one or more outputs based on the optimized estimates, e.g., of the hand force(s). For instance, the output may be indicative of an internal load exerted on the musculoskeletal body. Alternatively or additionally, the output may be or otherwise include an ergonomic risk assessment. In still other cases, the output may be or otherwise include force and/or other data to be used by a graphics or other engine, e.g., for rendering an image and/or otherwise controlling a video game.

CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for determining a hand force and a ground reaction force for a musculoskeletal body of a subject, the method comprising:
    obtaining, with a processor, video data for a musculoskeletal body during an action taken by the subject, the video data comprising a plurality of frames;
    generating, with the processor, for each frame of the plurality of frames, three-dimensional pose data for the subject based on a three-dimensional skeletal model; and determining, with the processor, the hand force and the ground reaction force based on the three-dimensional pose data, wherein determining the hand force and the ground reaction force comprises:

implementing, with the processor, a reconstruction of the hand force and the ground reaction force exerted on the musculoskeletal body during the action based on the three-dimensional pose data, the reconstruction being configured to determine an estimate for the ground reaction force in conjunction with an estimate for the hand force such that the estimate for the hand force is based on the estimate for the ground reaction force; and applying, with the processor, the three-dimensional pose data, the estimate for the ground reaction force, and the estimate of the hand force, to a recurrent neural network or a computer vision deep neural network to optimize the estimate of the hand force and the estimate of the ground reaction force.

2. The method of claim 1, wherein the reconstruction is based on a tree model.

3. The method of claim 1, further comprising providing, with the processor, an output indicative of the hand force to a graphics engine to apply the output to a procedure for rendering an image implemented by the graphics engine.

4. The method of claim 1, wherein the recurrent neural network comprises a long short-term memory (LSTM) neural network.

5. The method of claim 1, wherein implementing the reconstruction comprises determining a range for the ground reaction force based on constraints indicative of a set of configurations for the musculoskeletal body.

6. The method of claim 1, wherein the reconstruction is configured to determine the estimate for the ground reaction force for each frame of the plurality of frames.

7. The method of claim 1, wherein an optimization routine is configured to determine the ground reaction force for each frame of the plurality of frames.

8. The method of claim 1, wherein obtaining the video data comprises capturing, with a camera device, the video data.

9. The method of claim 1, further comprising generating, with the processor, an internal load exerted on the musculoskeletal body based on the ground reaction force and the hand force.

10. The method of claim 1, further comprising generating, with the processor, an external force exerted by the musculoskeletal body based on the hand force and the ground reaction force.

11. A system for determining a hand force and a ground reaction force for a musculoskeletal body of a subject, the system comprising:

a memory configured to store pose estimation instructions, force reconstruction instructions, and force optimization instructions; and a processor configured to obtain video data for the musculoskeletal body during an action taken by the subject, the video data comprising a plurality of frames, wherein the processor is further configured to:

upon execution of the pose estimation instructions, generate, for each frame of the plurality of frames, three-dimensional pose data for the subject based on a three-dimensional skeletal model, upon execution of the force reconstruction instructions, implement a reconstruction of the hand force and the ground reaction force exerted on the musculoskeletal body during the action based on the three-dimensional pose data, the reconstruction being configured to determine an estimate for the ground reaction force in conjunction with an estimate for the hand force such that the estimate for the hand force is based on the estimate for the ground reaction force, and upon execution of the force optimization instructions, apply the three-dimensional pose data, the estimate for the ground reaction force, and the estimate of the hand force, to a recurrent neural network to optimize the estimate of the hand force and the estimate of the ground reaction force.

12. The system of claim 11, wherein the reconstruction is based on a tree model.

13. The system of claim 11, wherein the recurrent neural network comprises a long short-term memory (LSTM) neural network.

14. The system of claim 11, wherein the memory is configured to additionally store output generation instructions, and wherein the processor is further configured to, upon execution of the output generation instructions, generate an internal load exerted on the musculoskeletal body based on the estimate of the hand force.

15. The system of claim 11, wherein the memory is configured to additionally store output generation instructions, and wherein the processor is further configured to, upon execution of the output generation instructions, generate an external force exerted by the musculoskeletal body based on the estimate of the hand force and the estimate for the ground reaction force.

16. The system of claim 11, wherein the processor is configured to, upon execution of the force reconstruction instructions, determine the estimate for the ground reaction force for each frame of the plurality of frames.

17. The system of claim 11, wherein implementing the reconstruction comprises determining a range for the ground reaction force based on constraints indicative of a set of configurations for the musculoskeletal body.

18. The system of claim 11, wherein the processor is further configured to provide an output indicative of the hand force to a graphics engine to apply the output to a procedure for rendering an image implemented by the graphics engine.

19. The system of claim 11, wherein the processor obtains the video data from a camera device.

20. The system of claim 11, wherein the memory is configured to additionally store output generation instructions, and wherein the processor is further configured to, upon execution of the output generation instructions, generate an ergonomic risk assessment based on the optimized estimate of the hand force and the optimized estimate of the ground reaction force.

* * * * *